United States Patent Office.

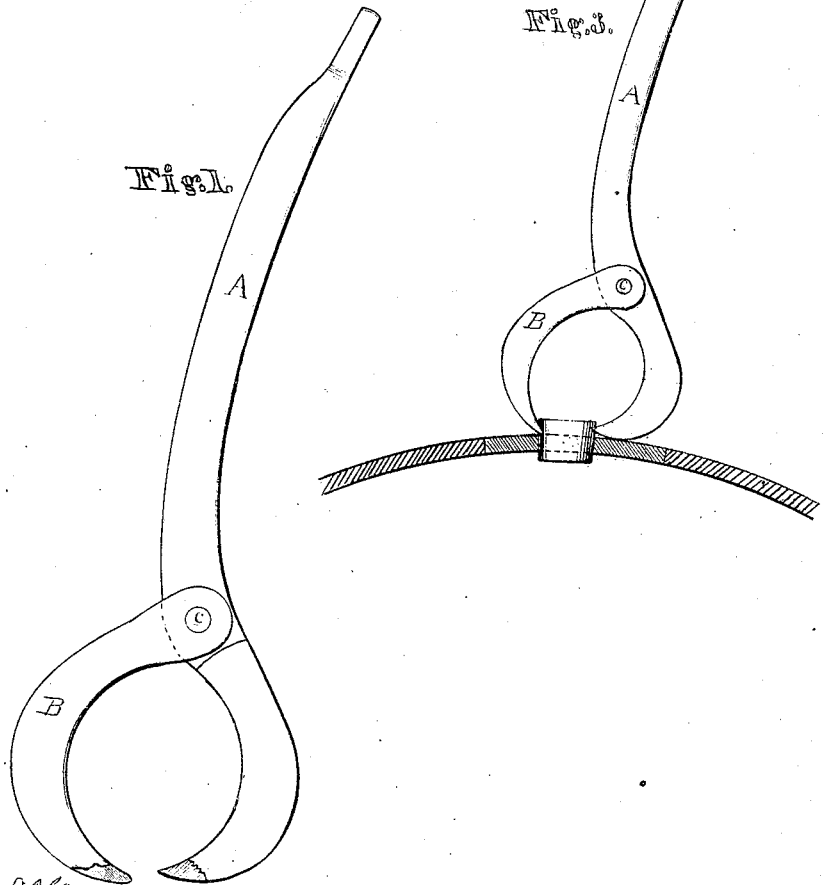

DAVID F. FETTER, OF NEW YORK, N. Y.

Letters Patent No. 110,127, dated December 13, 1870.

IMPROVEMENT IN BUNG-ELEVATORS.

The Schedule referred to in these Letters Patent and making part of the same.

*To all whom it may concern:*

Be it known that I, Doctor DAVID F. FETTER, of city, county, and State of New York, have invented a new and improved Bung-Extractor; and I do hereby declare that the following is a full, clear, and exact description thereof, which will enable others skilled in the art to make and use the same, reference being had to the accompanying drawing forming part of this specification, in which—

Figure 1 is a side view of my device, with the sides of the lever points, respectively, broken off, to show the sharp point of one and the blunt point of the other.

Figure 2 is a bottom view, showing the curved blunt point of one lever overlapping the sharp and nearly straight point of the other.

Figure 3 represents my device on duty.

My invention has relation to means for extracting stoppers or bungs from casks and barrels, and consists in a novel construction and combination of two bent levers pivoted to each other, and arranged in such manner that the blunt curved point of the shorter lever shall overlap the nearly straight sharp point of the longer.

It also consists in forming the lower section of the longer lever upon such a curve as to cause it to serve as a rocking fulcrum, uniform in shape and action, upon the staves of the cask or barrel.

The letter A of the drawing represents my long bent lever; and

Letter B, my short lever, pivoted to the long one at *c*.

From a point a short distance below the junction, the outer side of lever A is constructed with an uniform curve, as shown on figs. 1 and 3.

This curve extends to the extreme sharp point of the lever, and is intended to serve as a rocking fulcrum, uniform in shape, so that the bearing upon the stave shall be the same without regard to the altitude of the bung, or the point upon the bung where the two levers engage.

The extreme lower point of lever A is made sharp, and is bent slightly curved. In fact no curve whatever is necessary in this point.

The lever B is constructed with a blunt curved point, and is extended downward below the lower end of lever A, as shown, so that when not on duty it overlaps the same, as represented on figs. 1 and 2.

I am aware that cant-dogs and teeth-extractors have been manufactured with one long lever and a short one pivoted thereto; I do not, therefore, claim broadly the combination of such levers; but What I do claim, is—

The bung extractor described, formed by the construction and combination of the levers herein described, of which lever A is made to serve as a rocking fulcrum with a sharp point, and lever B has a curved blunt point overlapping lever A, in the manner specified.

DAVID F. FETTER, M. D.

Witnesses:
J. NORTON WILLIAMS,
J. F. WILLIAMS.